T. VEITCH.
SHOCK ABSORBER.
APPLICATION FILED SEPT. 17, 1907.

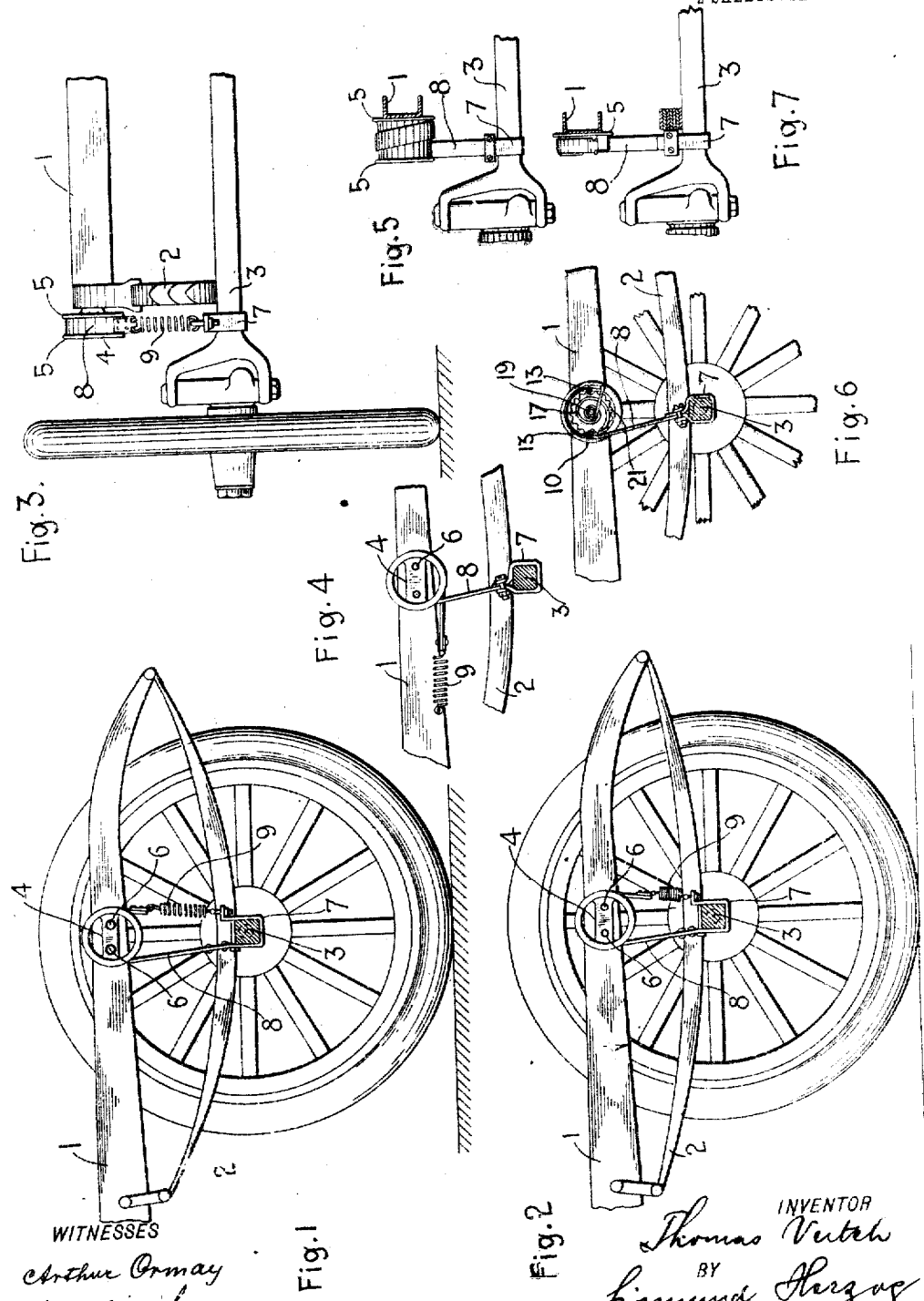

910,974.

Patented Jan. 26, 1909.
2 SHEETS—SHEET 2.

WITNESSES
Arthur Orma
S. Bimba

INVENTOR
Thomas Veitch
By Sigmund Herzog
his ATTORNEY

UNITED STATES PATENT OFFICE.

THOMAS VEITCH, OF DUMONT, NEW JERSEY, ASSIGNOR TO INTERNATIONAL PATENT CORPORATION, OF JERSEY CITY, NEW JERSEY, A CORPORATION OF SOUTH DAKOTA.

SHOCK-ABSORBER.

No. 910,974.

Specification of Letters Patent.

Patented Jan. 26, 1909.

Application filed September 17, 1907. Serial No. 393,279.

*To all whom it may concern:*

Be it known that I, THOMAS VEITCH, a citizen of the United States, and a resident of Dumont, in the county of Bergen and State of New Jersey, have invented certain new and useful Improvements in Shock-Absorbers, of which the following is a specification.

When driving motor vehicles or any other vehicles over a rough road or when on an even road the wheels of the same strike a stone or an obstruction in the road, the shock or jar which is given to the spring-supported body of the vehicle is very objectionable.

Various types of elastic suspension means have been interposed between the vehicle frame and the running gear of the same, different kinds and sizes of springs or friction devices being usually employed to diminish the transmission to the body or suspended portions of the vehicle of the shocks and vibrations. These devices, however, by reason of their elasticity and the freedom of movement cause a recoil shock which is almost as disagreeable and objectionable as the shocks of a vehicle having no shock absorbers at all.

It is now the object of the present invention to provide an improved shock absorber, having means for controlling the movement or vibrations of the spring-supported body of a vehicle relative to the running gear of the same, obviating the defects hereinbefore mentioned. Such a device can be carried out in various ways, according to the construction of the vehicle to which it is applied, and the drawings, forming part of the present application, show a few preferred forms of the invention.

The device consists essentially of a cylindrical body fastened against turning to the body or to the spring-support of the vehicle, and a belt or band, one end of which is secured to a non-rotating part of the axle of the vehicle, passes over the surface of cylindrical body, and is brought down on the other side of the same, its free end being attached to a resilient member, which is secured to a nonrotating portion of the axle or to the body of the vehicle.

The invention is illustrated in the accompanying drawings, in which—

Figure 1 illustrates a side elevation of the same, Fig. 2 shows the same when the springs of the vehicle are in their compressed state, Fig. 3 is an end elevation of a part of a car, and the shock absorber secured thereto.

Figure 9:
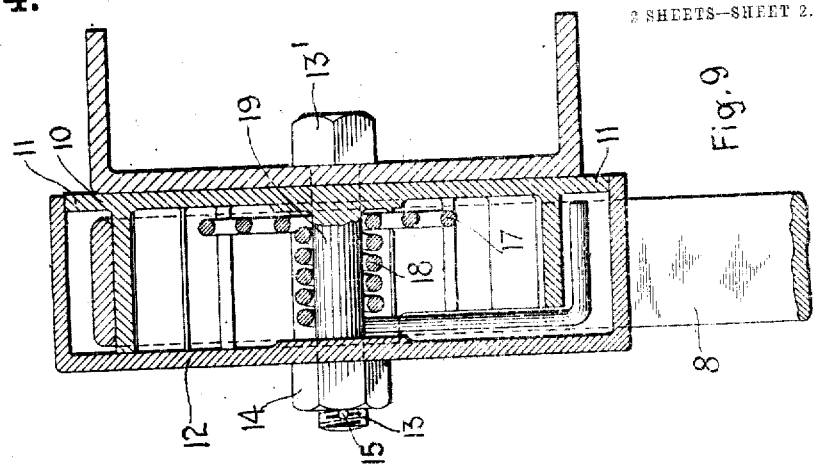
Figure 8:
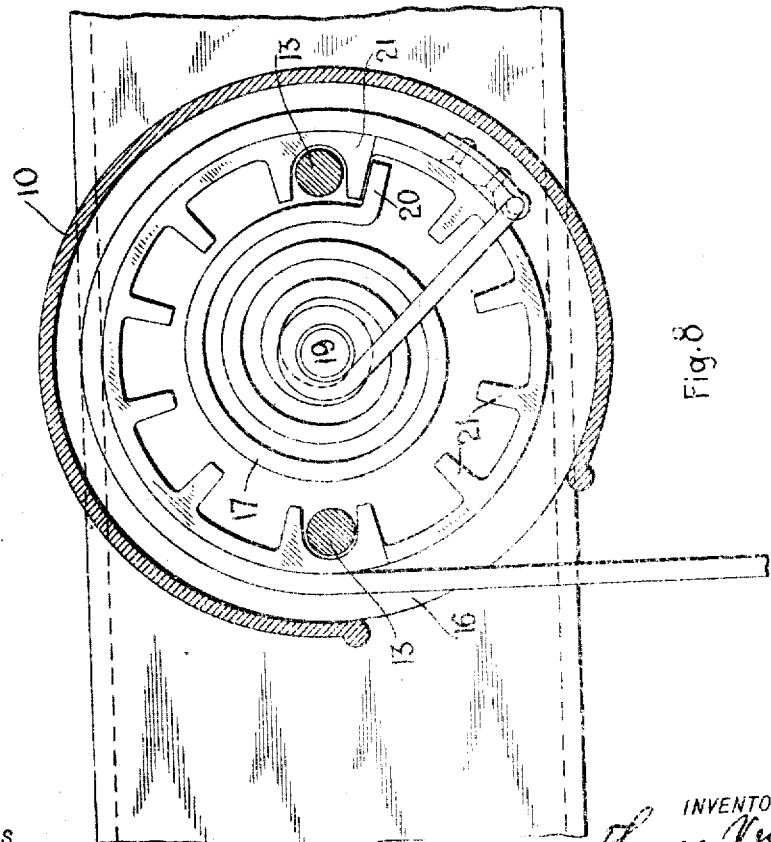

Figs. 4 and 5 illustrate a modification of the device, in which one end of the belt or band is attached to the body of the car; Figs. 6 and 7 show another modification of the device, while Figs. 8 and 9 are enlarged sectional views of the device, shown in Figs. 6 and 7.

In Figs. 1 to 3, 1 is the frame which supports the body of the vehicle to which the device is secured, and which rests upon the main springs 2. The shock controlling device, embodied in the present invention, is interposed between the body of the vehicle and the axle or a stationarily-supported part of the running gear, being attached at its lower and upper parts, respectively, to said body and axle of running gear.

The shock absorbing device comprises a cylindrical body, such as a drum 4, having rims or flanges 5, 5 on both sides of the same, and secured against rotation by screws 6, 6, to the frame 1 of the vehicle. A clip 7 is arranged on a stationary part of the axle 3, and fastened to the same in any suitable way, is a non-resilient band or belt 8, preferably made of camel's hair or any other non-stretching material. The belt runs over the drum 4, covering about one-half of its cylindrical surface, by making about one-half turn around the same. To the free end of this belt or band is attached in any manner known in the art a resilient member 9, the free end of which is secured to the clip 7 of the axle 3. In Figs. 1—3 of the drawings, this resilient member comprises a helical spring, adjustable to different weights and sizes of vehicles and, on the other hand, affording means to tighten or loosen the action of the belt or band 8. The dimensions of the belt and spring are such, that the spring is held in its almost extended state, when the main springs of the vehicle are in their normal position and the spring, returns to its normal form, when the main springs of the carriage are compressed. (Fig. 2).

In the modification shown in Figs. 4 and 5, the belt 8 runs practically over the entire cylindrical surface of the drum, and its spring 9 is fastened to the body of the car.

Figs. 6 to 9 show still another modification of the device. In this case the drum 10 comprises only one flange 11, while its other flange, preventing the band or belt 8 from slipping off the same, is formed by a cover 12 inclosing said drum. The drum and the cover, inclosing the same, are fastened to the body of the car or to the spring-support by bolts 13, 13, having heads 13', 13', which bolts pass through the drum and cover. The drum and cover are held in place by nuts 14—14, securely held against rotation by a nut-lock, such as a stud 15, passing through the bolt.

The belt 8 may be secured to a stationary part of the running gear by means of a clip 7, whence it runs through an opening 16 of the cover over the drum 10, the opening 16 being of a sufficient size to allow of a play of the belt. The free end of the belt or band 8 is attached to a spiral spring 17, one end of which forms a helical spring portion 18, wound around a stud 19. This helical portion is extended to the periphery of the drum and there secured to the belt or band 8. The other end 20 of the spring abuts one of the projections 21, formed on the drum and arranged on the inner cylindrical surface of the same. These projections allow of adjustment of the tension of the spring by bringing the end 20 of the same in contact with another of said projections.

When a wheel of the vehicle strikes an obstruction in the road, the springs 2, supporting the body of the vehicle, are compressed; the two parts of the support of the spring on the axle and on the frame of the vehicle are then brought closer together. When this occurs, the springs 9 or 17, as the case may be, return to their normal position and the band or belt 8 slips freely around the surface of the drum. On the immediate rebound or opening of the springs 2 of the vehicle, the band and its spring, secured thereto, tends to cause a braking action of a rope wrapped round a cleat or post, and it will be seen that a comparatively weak spring will cause a vastly augmented reaction or tension on the belt or band, as it tries to slip back to its normal position, when the spring 2 of the vehicle opens. The braking action thereby prevents the sudden upward throw of the vehicle body. It is obvious that the device does not affect the action of the vehicle spring in compressing, but prevents the reaction or rebound which very often causes broken springs and uncomfortable riding quality on the vehicle and the wear of the rubber tires of the same. The device acts, in other words, to dampen the excessive upward throw or rebound and flatten out the curve of vibrations of the springs, so that there are no violent or rapid changes of motions of the vehicle body, supported by the springs.

It is obvious that the drum may be secured to the stationary part of the running gear, while the ends of the belt may be secured to the vehicle body or some other stationary part of the vehicle without departing from the spirit and scope of the present invention.

It will be easily seen, that instead of the band 8 and resilient member 9 a resilient band may be used.

What I claim is:

1. The combination with a spring-supported vehicle body and its running gear, of a drum carried by one of said members, a band passing over said drum and secured to the other of said members, a spring adjustably secured to said drum, and an arm connecting said spring and said band, whereby said band is adapted to slide freely on said drum when the springs on said vehicle are compressing and cause a braking action, depending on the intensity of the shocks, upon said drum on the rebound of said springs.

2. The combination with a spring-supported vehicle body and its running gear, of a stationary drum carried by one of said members, a band passing over said drum and attached to the other of said members, and means secured to said band and said drum for varying the contact surface of said band and drum, and thus the braking action of said band, as the intensity of the shock varies.

3. The combination with a spring-supported vehicle body and its running gear, of a drum carried by one of said members, a band passing over said drum and secured to the other of said members, and a spring secured to said drum and said band so as to allow said band to slide freely on said drum when the springs of said vehicle are compressing and cause a braking action upon said drum on the rebound of the springs of the vehicle, depending upon the contact surface of the band and drum, which contact surface varies with the intensity of the shocks.

4. The combination with a spring-supported vehicle body and its running gear, of a drum carried by one of said members, a band passing over said drum and secured to the other of said members, a spring secured to said drum, and an arm carried by said spring and connecting the same with said band, whereby said band is adapted to slide freely on said drum when the springs of said vehicle are compressing and cause a braking action on the rebound of said vehicle springs, depending on the contact surface of said drum and band, which contact surface varies with the intensity of the shocks.

5. The combination with a spring-supported vehicle body and its running gear, of a stationary cylindrical body carried by one of said members, a band passing over said cylindrical body and secured to both of said members, and means whereby the contact surface of said band and said drum is varied as the intensity of the shocks varies.

6. The combination with a spring-supported vehicle body and its running gear, of a stationary drum carried by one of said members, a band passing over a portion of the surface of said drum and secured to the other of said members, a spring secured to said drum, and an arm carried by said spring and connecting the same with said band.

7. The combination with a spring-supported vehicle body and its running gear, of a stationary drum carried by one of said members, a band passing over a portion of the surface of said drum and secured to the other of said members, a spring secured to said drum, an arm carried by said spring and connecting the same with said band, and means for adjusting the tension of said spring.

8. The combination with a spring-supported vehicle body and its running gear, of a stationary drum carried by one of said members, a band passing over said drum and secured to the other of said members, a spring secured to said drum, and an arm connecting said spring and said band, whereby said band is adapted to slide freely on said drum when the springs on said vehicle are compressing and cause a braking action, depending on the intensity of the shocks, upon said drum on the rebound of said springs.

Signed at New York, in the county of New York, and State of New York, this 13th day of September, A. D. 1907.

THOMAS VEITCH.

Witnesses:
SIGMUND HERZOG,
S. BIRNBAUM.